Sept. 30, 1941.   J. F. SLADKY   2,257,706
HORN SWITCH
Filed Oct. 21, 1939
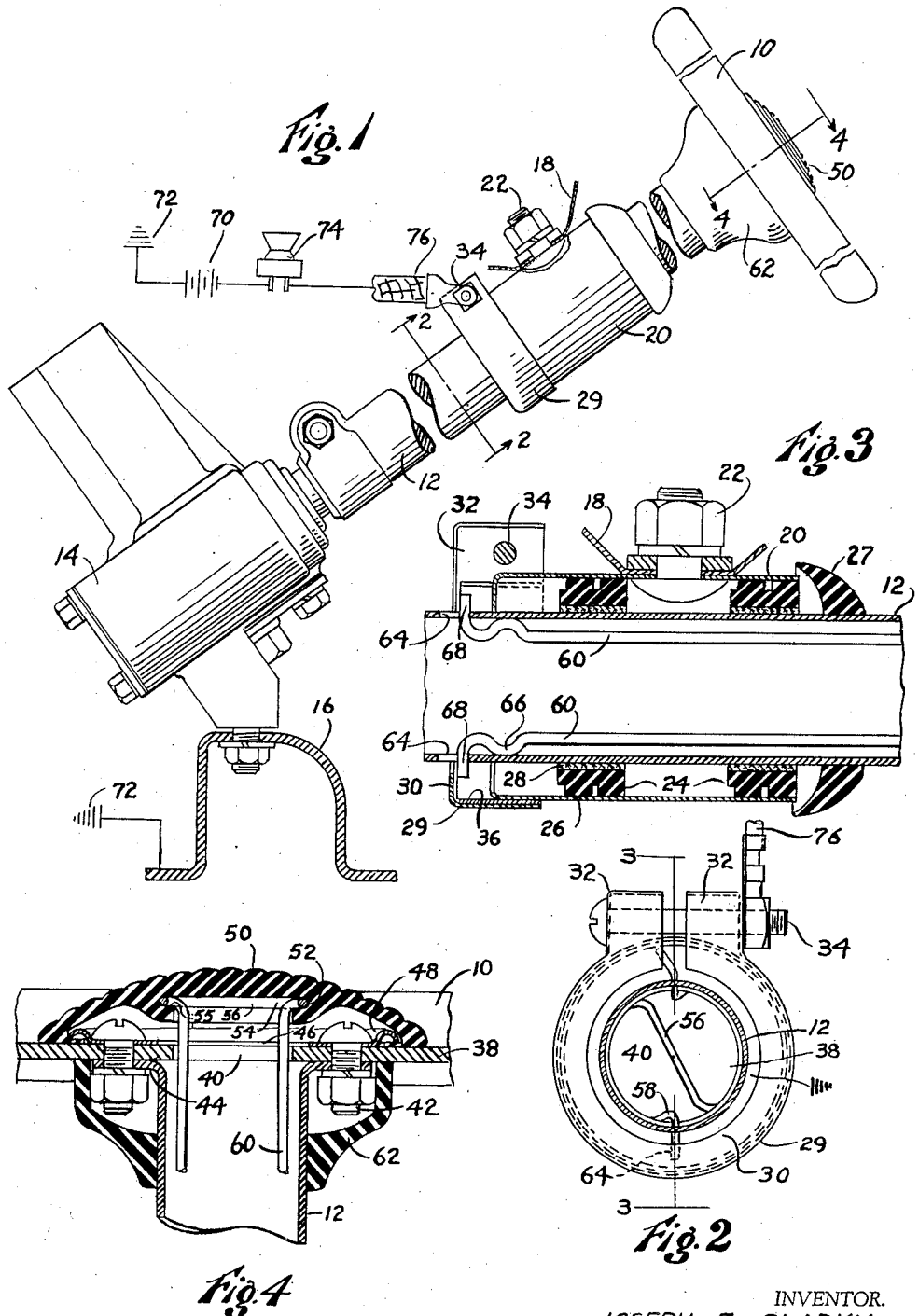
INVENTOR.
JOSEPH F. SLADKY
BY Carl J. Barbee
his ATTORNEY.

Patented Sept. 30, 1941

2,257,706

UNITED STATES PATENT OFFICE 2,257,706

HORN SWITCH

Joseph F. Sladky, Racine, Wis., assignor to Nash-Kelvinator Corporation, Kenosha, Wis., a corporation of Maryland Application October 21, 1939, Serial No. 300,492

6 Claims. (Cl. 200—59)

This invention relates to automobiles and has particular reference to the wiring and connections for an automobile horn and horn button.

It is an object of this invention to provide a horn switch which is cheaply and easily installed.

It is an object of this invention to provide a novel horn button which provides its own restoring force.

It is another object of this invention to provide a novel bracket for supporting a steering column which also forms a support for a horn circuit contact.

It is another object of this invention to provide a horn switch which is of simple construction and very unlikely to get out of adjustment.

Other objects and advantages of this invention will be apparent from a consideration of the following specification and the attached drawing of which there is one sheet and in which Figure 1 represents a side elevation of the steering column of an automobile to which my horn button and switch is attached;

Figure 2 is a section taken along the line 2—2 of Figure 1 and looking in the direction of the arrows;

Figure 3 is a section taken along the line 3—3 of Figure 2 and looking in the direction of the arrows;

Figure 4 is a section taken along the line 4—4 of Figure 1 and looking in the direction of the arrows.

In the drawing are illustrated a steering wheel 10, steering column 12, steering gear 14, and a frame member 16 which may be an axle or other portion of the car frame. As is more clearly illustrated in Figure 3, the steering column 12 is supported from a portion of the instrument panel 18 by means of a tube 20 which is bolted to the instrument panel by means of a bolt 22. Located inside of the tube are two bearing members 24. These bearings are illustrated as being made up of an annular rubber ring 26 which is cemented to the inside of the tube and a wearing or face portion 28 which is a composition made up of wood fiber, graphite and a hard rubber binder. This type of bearing composition will withstand the wear caused by rotating the steering column and at the same time is easily joined as by vulcanizing with the rubber portion of the bearing which forms a cushion for dampening vibration in the column and in the instrument panel. 27 is a rubber gasket fixed to the steering column to mask the end of the cylinder 20.

Attached to the lower end of the tube 20 is a ring shaped contact member 29 which has an inturned flange 30 along its bottom portion. The ring 29 is split and has the ear members 32 turned out at its ends to form connections for the bolt 34. This allows the ring to be placed over the tube 20 and then tightened down by means of the bolt 34. Cemented to the inside of the ring 29 is a strip of insulating material 36 which insulates the contact ring 29 electrically from the tube 20. It is to be noted that the inturned flange 30 is not insulated.

The steering wheel 10 is provided with a spoke member 38 having a hole 40 in the center thereof. This spoke 38 is fastened to the steering column 12 by means of bolts 42 passed through the spoke and through an outturned flange 44 at the top of the steering column. The bolts 42 also hold in place an annular ring 46 which has a rim 48 raised around its outer edge. The rim 48 serves to retain the horn button 50 in position. It is to be noted that the horn button 50 is generally concave on its underside and spherical in its outside contour. The under portion is thickened at 52 to provide space for wire contact member 54 which is snapped into an annular groove 55 in the thickened portion 52 of the horn button. The wire contact member 54 has a cross piece 56, each end of which is bent in a half circle to form a ring which is adapted to be sprung into the groove 55 in the horn button. Each end of the circle portions is bent out at 58 and down to form depending finger portions 60 which pass through the hole 40 in the spoke and down the inside of the steering column 12 for a purpose which will be described later. The bolts 42 may be concealed on the under side of the wheel by means of a trim gasket 62 held to the steering column by its own resiliency.

Just below the end of the tube 20 and opposite the flange 30 on the contact ring 29 the steering column 12 is provided with two holes or slots 64. The fingers 60 from the horn button are provided with an outside bend 66 which creates a sufficient spring between the two fingers to maintain the bends 66 in electrical contact with the inside of the steering column 12. Below the bend 66 each end of the finger portions 60 is bent out so as to pass through the holes 64 in the steering column. These end portions 68 project over the flange 30 on the contact ring 29. It is thus apparent that when the horn button 50 is pressed down against its own resiliency, the bends 66 will slide down in contact with the inside of the steering column, and the end portions 68 of the fingers will make contact with the flange 30 of the contact ring 29.

The horn circuit, which I have shown schematically in Figure 1, may be of any desired type consisting of a battery 70 with a grounded side 72, a horn 74 connected to the live side of the battery, and a cable 76 leading to the contact ring 29 where it is fastened by means of the bolt 34. Since the steering column 12 will be grounded through the steering gear 14 to the frame 16, which also serves as the ground 72 for the battery, it is evident that a completed circuit will be formed through the battery and horn when the finger 60 makes contact between the ring 28 and the steering column as was explained before.

It is particularly pointed out that the finger members 60 with their top portion 36 may be easily snapped into the horn button 50 and then inserted down the steering column 12 until the ends snap through the holes 64 in the steering column. The spring action from the fingers 60 maintains the necessary contacts with the steering column, and the natural spring of the concave rubber horn button furnishes the restoring energy for the horn switch. It is also to be noted that the under side of the horn button is open to the atmosphere of the car through the steering column and the holes 64. This prevents any suction from tending to hold the horn button from assuming its normal shape and position when released. With this construction there is no connection which may get loose or out of order; also the assembly may be made without use of tools or complicated adjustments.

While I have described my invention in some detail, I intend this to be an example only and not limiting on my invention to which I make the following claims:

1. In a steering post assembly, an instrument panel, a tube fixed to said panel, a steering column journaled in said tube, a collar having an inturned flange and clamped to said tube but insulated therefrom, one terminal of a horn circuit attached to said collar, and means comprising a metallic finger slideable longitudinally within said column and having a finger projecting from the side thereof for electrically connecting said collar with said steering column.

2. In combination with a wheel having a flat hubless spoke with a hole in the center thereof, a hollow steering column with a flange at its upper end, bolts holding said spoke and said flange together, an annular plate having an outer rim and held in place by said bolts, a dome shaped horn button held in position by said rim on said annular plate, a finger member held in place by said button and extending down and in contact with said steering column, a live contact for a horn circuit positioned near but spaced from said steering column, a slot formed in said steering column adjacent said live contact, a bend in said finger extending through said slot and engageable with said contact when said button is depressed, and a ground for said steering column.

3. In a steering post assembly, a hollow column having a hole in the side thereof, a horn circuit contact projecting through said hole and movable longitudinally of said column, a fixed tube positioned around said column near said hole, and a live contact for a horn circuit clamped to and insulated from said tube in such a position as to be contacted by said first mentioned horn circuit contact.

4. A horn switch comprising a hollow steering column defining a slot below the upper end thereof, a support for said column, a live contact supported by, but insulated from said support, an annular flange on said live contact positioned around said column and adjacent to said slot, a metal finger within said column and in contact therewith, a bent over end portion on said finger extending through said slot and overhanging said annular rim, and means including a horn button for sliding said finger in said tube to contact said end portion with said annular ring.

5. A horn switch comprising a hollow steering column defining a pair of slots, a movable contact having two metal fingers positioned in said column, said fingers being urged into contact with said column by their own resiliency, end portions on said fingers extending through said slots, a support for said column, a live contact carried on and insulated from said support, an annular flange on said live contact positioned around said column and adjacent to said end portions, and means for moving said finger longitudinally in said column.

6. A horn switch comprising a hollow steering column defining an aperture below its upper end, a movable contact carried in said column and having a portion extending through said aperture, and a live contact carried in spaced relationship around said column and adjacent to said aperture.

JOSEPH F. SLADKY.